(12) United States Patent
Liu

(10) Patent No.: US 10,193,213 B2
(45) Date of Patent: Jan. 29, 2019

(54) SELF-ADAPTIVE ANTENNA SYSTEMS FOR ELECTRONIC DEVICES HAVING MULTIPLE FORM FACTORS

(71) Applicant: MICROSOFT TECHNOLOGY LICENSING, LLC, Redmond, WA (US)

(72) Inventor: Luyi Liu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 14/883,254

(22) Filed: Oct. 14, 2015

(65) Prior Publication Data

US 2017/0110786 A1 Apr. 20, 2017

(51) Int. Cl.

| | |
|---|---|
| *H01Q 1/24* | (2006.01) |
| *H01Q 1/22* | (2006.01) |
| *G06F 1/16* | (2006.01) |
| *H01Q 5/378* | (2015.01) |
| *H04M 1/02* | (2006.01) |

(52) U.S. Cl.
CPC ........... *H01Q 1/243* (2013.01); *G06F 1/1698* (2013.01); *H01Q 1/2266* (2013.01); *H01Q 5/378* (2015.01); *H04M 1/0214* (2013.01); *H04M 1/0247* (2013.01)

(58) Field of Classification Search
CPC ....... H01Q 1/243; H01Q 5/378; H01Q 1/2266
See application file for complete search history.

(56) References Cited

U.S. PATENT DOCUMENTS

| | | |
|---|---|---|
| 5,561,436 A | 10/1996 | Phillips |
| 6,327,485 B1 | 12/2001 | Waldron |
| | (Continued) | |

FOREIGN PATENT DOCUMENTS

| | | | |
|---|---|---|---|
| CN | 101036262 A | 9/2007 | |
| EP | 1555716 A1 * | 7/2005 | ............. H01Q 1/243 |
| | (Continued) | | |

OTHER PUBLICATIONS

"International Preliminary Report on Patentability Issued in PCT Application No. PCT/US2016/052376", dated Sep. 27, 2017, 6 Pages.

(Continued)

*Primary Examiner* — Dieu H Duong
(74) *Attorney, Agent, or Firm* — Fiala & Weaver P.L.L.C.

(57) ABSTRACT

An electronic device is described that is configurable to be transitioned from a first operating mode having a first form factor to a second operating mode having a second form factor. The electronic device includes a first device portion and a second device portion that is connected to the first device portion. The first device portion includes an RF antenna. The second device portion includes an antenna adaptation element. The antenna adaptation element is positioned more closely to the RF antenna in the second operating mode than in the first operating mode. The antenna adaptation element is configured to, in the second operating mode, passively counteract or mitigate a shifting of a resonant frequency of the RF antenna that would otherwise occur as a result of the electronic device being transitioned from the first operating mode to the second operating mode.

20 Claims, 12 Drawing Sheets

(56) References Cited

U.S. PATENT DOCUMENTS

| | | |
|---|---|---|
| 6,822,611 B1 | 11/2004 | Kontogeorgakis et al. |
| 8,179,334 B2 | 5/2012 | Pathak et al. |
| 2002/0186169 A1 | 12/2002 | Iwai et al. |
| 2003/0210206 A1 | 11/2003 | Phillips et al. |
| 2005/0007283 A1 | 1/2005 | Jo et al. |
| 2005/0026660 A1 | 2/2005 | Park et al. |
| 2005/0113037 A1 | 5/2005 | Ponce De Leon et al. |
| 2008/0303723 A1 | 12/2008 | Bengtsson |
| 2009/0033566 A1 | 2/2009 | Nakanishi et al. |
| 2009/0098827 A1 | 4/2009 | Koyama |
| 2010/0279747 A1 | 11/2010 | Imano et al. |
| 2011/0080703 A1 | 4/2011 | Schlesener et al. |
| 2013/0009829 A1* | 1/2013 | Kurihara ............... H01Q 1/243 343/702 |
| 2013/0257661 A1 | 10/2013 | Yuasa et al. |
| 2015/0062525 A1* | 3/2015 | Hirakata ........... G02F 1/133305 349/158 |
| 2015/0085433 A1 | 3/2015 | Kim |

FOREIGN PATENT DOCUMENTS

| | | |
|---|---|---|
| EP | 1635313 A2 | 3/2006 |
| JP | 10084406 A * | 3/1998 |
| WO | 2006011254 A1 | 2/2006 |

OTHER PUBLICATIONS

Zaman, et al., "Analysis of Resonance Response Performance of C-Band Antenna Using Parasitic Element", In Proceedings of the Scientific World Journal, vol. 2014, May 6, 2014, 7 pages.

Liu, et al., "Electrically Small Antenna Tuning Techniques", 2009 Loughborough Antennas & Propagation Conference, Loughborough, UK, Nov. 16-17, 2009, 4 pages.

"International Search Report and Written Opinion Issued in PCT Application No. PCT/US2016/052376", dated Dec. 23, 2016, 14 Pages.

* cited by examiner

SELF-ADAPTIVE ANTENNA SYSTEMS FOR ELECTRONIC DEVICES HAVING MULTIPLE FORM FACTORS

BACKGROUND

Two significant factors associated with radio frequency (RF) antenna design are the antenna resonant point or center operating frequency (also referred to herein as the "resonant frequency") and the antenna bandwidth or the frequency range over which the antenna design can operate. Since these two factors are very important features of antenna design, they are often specified by various RF communications standards. Whether the RF antenna is used for cellular telecommunication, wireless local area network (WLAN) communication, a Global Positioning System (GPS) receiver, or some other application, the performance of the RF antenna is paramount, and the antenna resonant frequency and the antenna bandwidth are of great importance in this regard.

An RF antenna is a form of tuned circuit consisting of inductance and capacitance, and as a result it has a resonant frequency. This is the frequency at which the capacitive and inductive reactances cancel each other out. At this point the RF antenna appears purely resistive, the resistance being a combination of the loss resistance and the radiation resistance. The capacitance and inductance of an RF antenna are determined by its physical properties and the environment in which it is located. Most RF antenna designs are operated around the resonant point. This means that there is only a limited bandwidth over which an RF antenna design can operate efficiently. Outside this, the levels of reactance rise to levels that may be too high for satisfactory operation. Other performance characteristics of the antenna may also be impaired when the antenna is operated away from the resonant frequency.

SUMMARY

An electronic device is described herein that is configurable to be transitioned from a first operating mode having a first form factor to a second operating mode having a second form factor. The electronic device includes a first device portion and a second device portion that is connected to the first device portion. The first device portion includes an RF antenna. The second device portion includes an antenna adaptation element. The antenna adaptation element is positioned more closely to the RF antenna in the second operating mode than in the first operating mode. The antenna adaptation element is configured to, in the second operating mode, passively counteract or mitigate a shifting of a resonant frequency of the RF antenna that would otherwise occur as a result of the electronic device being transitioned from the first operating mode to the second operating mode. The RF antenna and the antenna adaptation element thus comprise a self-adaptive antenna system for the electronic device. Additional antenna adaptation elements can be added to the system to support additional operating modes and form factors. Furthermore, a similar self-adaptive antenna system can be used for systems that include an electronic device that can be operated while inserted into a structure (e.g., a docking station, a carrying case, a sheath or a holster), wherein the electronic device includes an RF antenna and the structure includes an antenna adaptation element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiment and to enable a person skilled in the relevant art(s) to make and use the embodiments.

Figure 1:
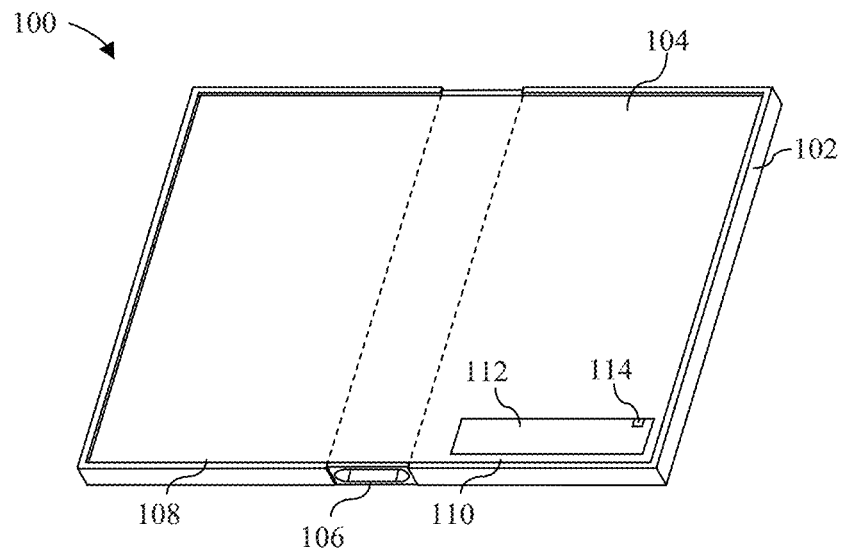
FIG. 1 is a perspective view of a foldable electronic device in a "tablet/phablet mode."

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Self-Adaptive Antenna Systems for Electronic Devices Having Multiple Form Factors As noted in the Background Section above, the resonant frequency of an RF antenna is a critical factor for ensuring satisfactory antenna performance. However, due to the environment in which the RF antenna is operating, the resonant frequency of the RF antenna may be shifted away from a desired frequency or frequency band for RF communication. This concept will now be further discussed in reference to FIGS. 1-3.

Figure 2:
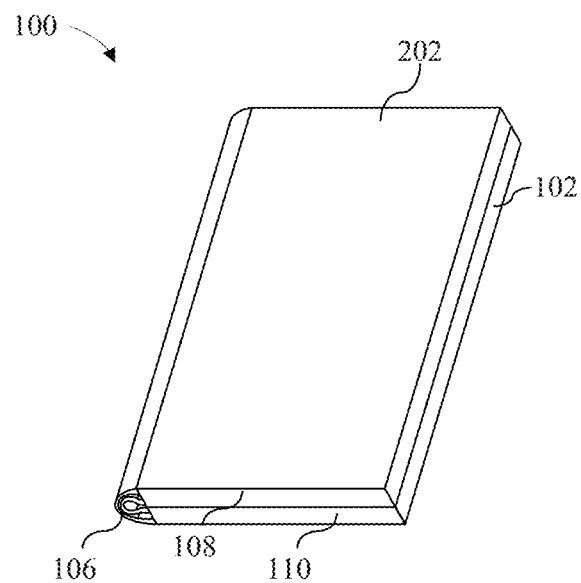
FIG. 2 is a perspective view of the foldable electronic device of FIG. 1 in a "phone mode."

In particular, FIGS. 1 and 2 provide perspective views of an exemplary foldable electronic device 100. Foldable electronic device 100 comprises a housing 102, a foldable display 104, and a flexible connector 106 that serves to connect a first portion 108 of foldable electronic device 100 to a second portion 110 thereof. An RF antenna 112 is located in an internal cavity defined at least in part by housing 102 and is connected via a feed 114 to an RF transmitter and/or receiver (not shown) that is also disposed within the same cavity. RF antenna 112 and feed 114 are further situated within second portion 110 of foldable electronic device 100. RF antenna 112 and feed 114 are shown in FIG. 1 for the sake of illustration only; it is to be understood that, in this embodiment, such components are disposed in an internal cavity of foldable electronic device 100 and thus would not normally be visible to an end user thereof.

RF antenna 112 is used to facilitate the transmission and/or reception of RF signals by foldable electronic device 100 in a well-known manner, thereby enabling foldable electronic device 100 to engage in RF communication. For example and without limitation, such RF communication may include communication in accordance with an RF-based short-range communication technology such as Bluetooth™, as described in the various standards developed and licensed by the Bluetooth™ Special Interest Group, or a technology such as ZigBee® that is based on the IEEE 802.15.4 standard for wireless personal area networks (specifications describing ZigBee are publically available from the ZigBee® Alliance). Such RF communication may also include communication in accordance with a cellular telecommunication standard, such as Code Division Multiple Access (CDMA), Time Division Multiple Access (TDMA), Frequency Division Multiple Access (FDMA), Frequency Division Duplex (FDD), Global System for Mobile Communications (GSM), Wideband-CDMA (W-CDMA), Time Division Synchronous CDMA (TD-SCDMA), Long-Term Evolution (LTE), Time-Division Duplex LTE (TDD-LTE) communication, and/or the like. Such RF communication may also include communication in accordance with any of the well-known IEEE 802.11 protocols, communication in accordance with GPS protocols, or communication in accordance with any other RF-based communication technology.

RF antenna 112 may comprise any one of a variety of different RF antenna types. For example, RF antenna 112 may comprise a microstrip antenna (e.g., a patch antenna), a planar inverted-F antenna (PIFA), a monopole antenna, a loop antenna, or any other type of RF antenna suitable for enabling foldable electronic device 100 to engage in RF communication.

FIG. 1 shows foldable electronic device 100 in an "open mode," which may also be referred to as a "tablet mode" or "phablet mode" for this particular device. In this mode, a user of foldable electronic device 100 can view content that is rendered to foldable display 104 and potentially interact therewith (e.g., via integrated touch sensors or some other user input mechanism).

By applying a suitable amount of pressure to one or both of first portion 108 and second portion 110 of foldable electronic device 100, a user can cause flexible connector 106 to bend or fold along its long axis (which also causes foldable display 104 to bend or fold), thereby causing foldable electronic device 100 to assume the "folded mode" configuration shown in FIG. 2. This mode may also be referred to as a "phone mode" for this particular device. In the "phone mode," foldable display 104 is concealed from the user and the user may instead interact with some form of user interface that is accessible via a back surface 202 of first portion 108 of foldable electronic device 100. This additional user interface, may comprise, for example, another display that is smaller than foldable display 104, one or more light emitting diodes (LEDs), one or more buttons, or the like.

Figure 3:
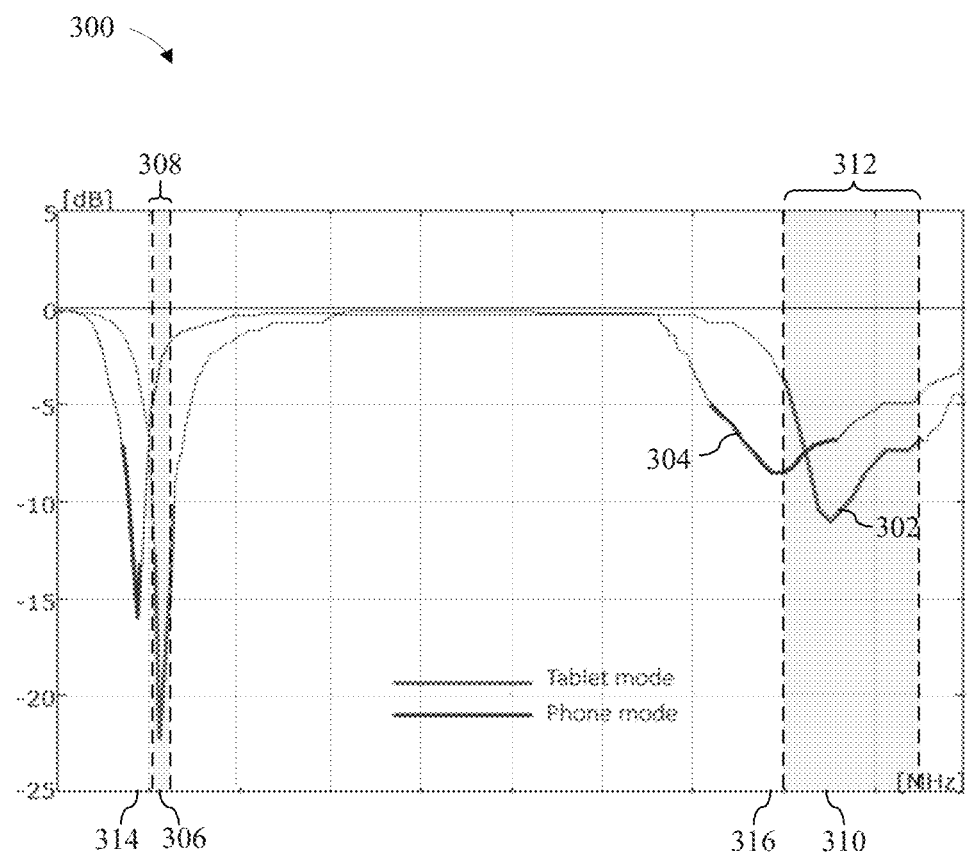
FIG. 3 is a graph that shows the reflection coefficient at various frequencies for an RF antenna of the foldable electronic device of FIGS. 1 and 2 when operating in the "tablet/phablet mode" and when operating in the "phone mode."

FIG. 3 is a graph 300 that shows the reflection coefficient in decibels (dB) at various frequencies for RF antenna 112 when foldable electronic device 100 is operating in the "tablet/phablet mode" and when foldable electronic device 100 is operating in the "phone mode." In particular, a plot 302 shows the reflection coefficient at various frequencies for RF antenna 112 when foldable electronic device 100 is operating in the "tablet/phablet mode" of FIG. 1 while a plot 304 shows the reflection coefficient at various frequencies for RF antenna 112 when foldable electronic device 100 is operating in the "phone mode" of FIG. 2. The reflection coefficient may be calculated in accordance with:

$$RC = 10\log_{10}\frac{P_r}{P_i}$$

where RC represents the reflection coefficient, $P_i$ represents the power incident upon or input to RF antenna 112, and $P_r$ represents the power reflected by RF antenna 112.

As shown by plot 302, when foldable electronic device 100 is operating in the "tablet/phablet mode," RF antenna 112 has a first resonant frequency 306 that is within a first frequency band 308 and a second resonant frequency 310 that is within a second frequency band 312. For the purposes of this example, it is to be assumed that first frequency band 308 and second frequency band 312 comprise target frequency bands for RF communication. For example, first frequency band 308 and second frequency band 312 may respectively comprise target low-frequency and high-frequency bands specified for communication in accordance with a particular RF communication standard. Each resonant frequency of plot 302 is indicated by a corresponding peak minimum reflection coefficient, with a peak minimum reflection coefficient of approximately −22 dB at first resonant frequency 306 and a peak minimum reflection coefficient of approximately −11 dB at second resonant frequency 310. Around these points, power is radiated relatively well by RF antenna 112. Since first resonant frequency 306 and second resonant frequency 310 of RF antenna 112 lie well within the target frequency bands, RF antenna 112 can be expected to provide acceptable RF communication performance when foldable electronic device 100 is operating in the "tablet/phablet mode."

As shown by plot 304, however, when foldable electronic device 100 is operating in the "phone mode," the resonant frequencies of RF antenna 112 are shifted downward and outside of the target frequency bands for RF communication. In particular, when foldable electronic device 100 is operating in the "phone mode," RF antenna 112 has a first resonant frequency 314 that is outside and below first frequency band 308 and a second resonant frequency 316 that is outside and below second frequency band 312. This shift in resonant frequencies is attributable to the change of form factor of foldable electronic device 100 that occurs when foldable electronic device 100 is converted from the "tablet/phablet mode" to the "phone mode." In particular, in the "phone mode" of operation, RF antenna 112 is covered by additional materials present in first portion 108 of foldable electronic device 100 as shown in FIG. 2. This impacts the performance characteristics of RF antenna 112, including the resonant frequencies thereof. Also, if RF antenna 112 is connected to a ground plane of a PCB that is internal to foldable electronic device 100, and such PCB is split as a result of the folding of foldable electronic device 100, then the size of the ground for RF antenna 112 will change. This will also impact the performance characteristics of RF antenna 112, including the resonant frequencies thereof.

The shifting of the resonant frequencies of RF antenna 112 in "phone mode" as shown in graph 300 will cause RF antenna 112 to radiate power poorly in the target frequency bands. This will adversely impact the ability of foldable electronic device 100 to carry out RF communication in those bands. In fact, the wireless performance may be so poor that foldable electronic device 100 may not be able to achieve required performance levels as specified by a particular RF communication standard.

The foregoing description of FIGS. 1-3 illustrates a problem associated with providing tunable RF antenna solutions for foldable electronic devices—namely, that the changing form factor of such devices create an inconsistent antenna working environment. In particular, the changing form factor of such devices can result in a shift of the antenna resonance away from the desired frequencies for RF communication. Depending upon a variety of factors (including but not limited to the type of RF antenna), such shifting may be downward such that the antenna resonance is shifted below a desired frequency for RF communication (as in the example set forth above) or upward such that the antenna resonance is shifted above a desired frequency for RF communication.

Foldable electronic device embodiments described herein address the foregoing issue by including on or within the foldable electronic device an antenna adaptation element. The antenna adaptation element is positioned such that when the foldable electronic device is in a first operating mode (e.g., an unfolded mode), the antenna adaptation element is sufficiently distanced from the RF antenna that it does not impact (or significantly impact) the performance characteristics of the RF antenna. However, when the foldable electronic device is in a second operating mode (e.g., a folded mode), the antenna adaptation element is brought sufficiently close to the RF antenna that it modifies the performance characteristics thereof. In particular, in the second operating mode, the antenna adaptation element is positioned such that it mitigates or counteracts an undesired shifting of the RF antenna resonant frequency that would otherwise occur due to the folding of the device, as was discussed above in reference to FIG. 3. For example, in the second operating mode, the antenna adaptation element may be positioned such that it ensures that a resonant frequency of the RF antenna remains within a target frequency band.

Figure 5:
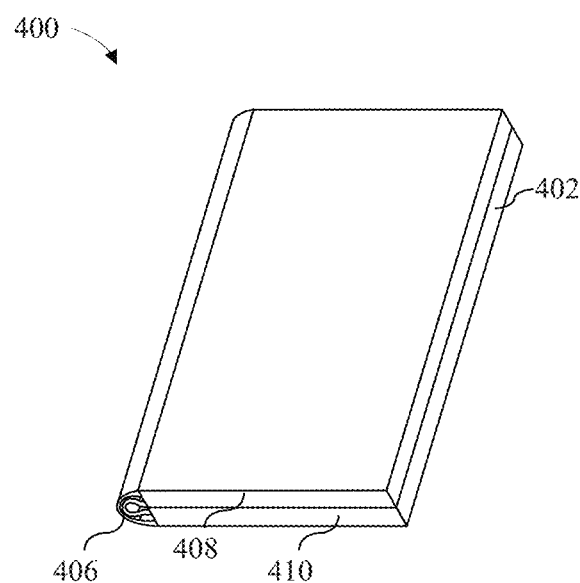
FIG. 5 is a perspective view of the foldable electronic device of FIG. 4 in a "phone mode."
Figure 6:
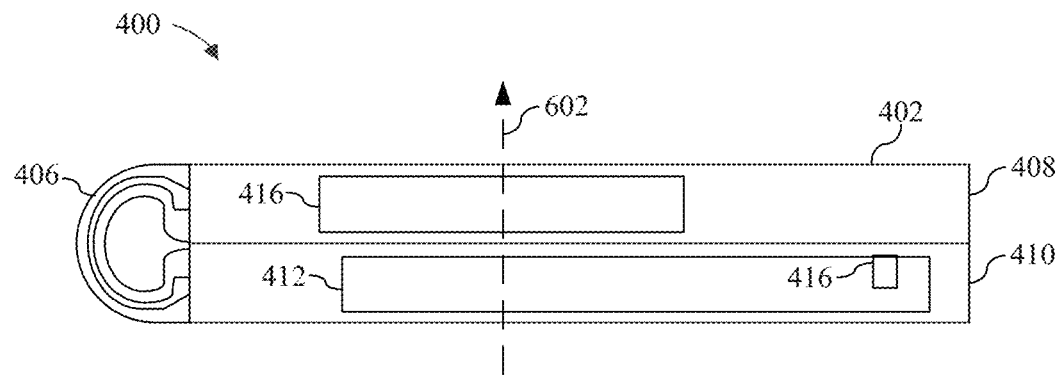
FIG. 6 is a side perspective view of the foldable electronic device of FIGS. 4 and 5 in a "phone mode."

An embodiment of a foldable electronic device that illustrates this concept will now be described. In particular, FIGS. 4-6 provide perspective views of an exemplary foldable electronic device 400 that has a design that is substantially similar to foldable electronic device 100 in all regards, except for the addition of an antenna adaptation element 416.

Like foldable electronic device 100, foldable electronic device 400 comprises a housing 402, a foldable display 404, and a flexible connector 406 that serves to connect a first portion 408 of foldable electronic device 400 to a second portion 410 thereof. An RF antenna 412 is located in an internal cavity defined at least in part by housing 402 and is connected via a feed 414 to an RF transmitter and/or receiver (not shown) that is also included within the same cavity. RF antenna 412 and feed 414 are further situated within second portion 410 of foldable electronic device 400.

Figure 4:
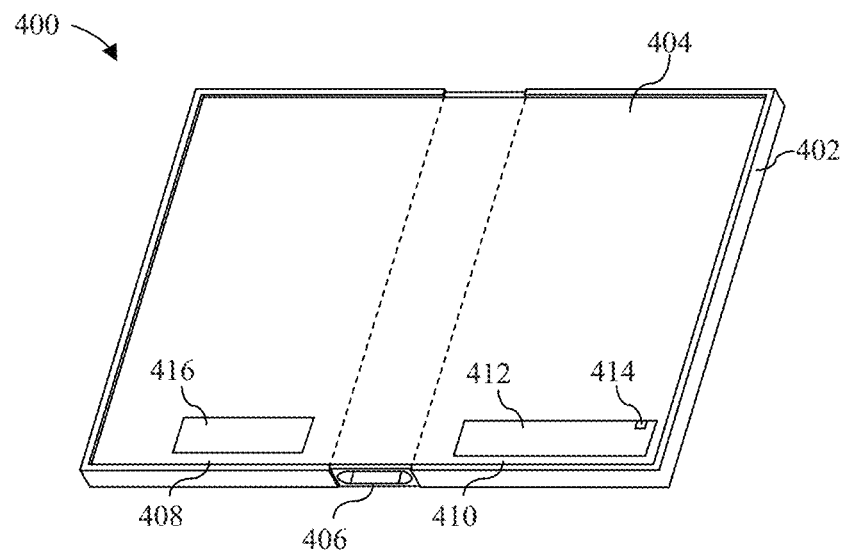
FIG. 4 is a perspective view of a foldable electronic device in a "tablet/phablet mode," the foldable electronic device including a self-adaptive RF antenna system in accordance with an embodiment.

As further shown in FIG. 4, foldable electronic device 400 also includes antenna adaptation element 416. In this embodiment, antenna adaptation element 416 is disposed within an internal cavity defined at least in part by housing 402. Antenna adaptation element 416 is further situated within first portion 408 of foldable electronic device 400. RF antenna 412, feed 414 and antenna adaptation element 416 are shown in FIG. 4 for the sake of illustration only; it is to be understood that, in this embodiment, such components are disposed within one or more internal cavities of foldable electronic device 400 and thus would not normally be visible to an end user thereof.

RF antenna 412 is used to facilitate the transmission and/or reception of RF signals by foldable electronic device 400 in a well-known manner, thereby enabling foldable electronic device 400 to engage in RF communication. Such RF communication may be carried out in accordance with any of the RF-based communication technologies previously described herein. Furthermore, RF antenna 412 may comprise any one of a variety of different RF antenna types (e.g., microstrip antenna, PIFA, monopole antenna, loop antenna).

FIG. 4 shows foldable electronic device 400 in an "open mode" or "tablet/phablet" mode. In this mode, a user of foldable electronic device 400 can view content that is rendered to foldable display 404 and potentially interact therewith. Furthermore, in this mode, antenna adaptation element 416 is far enough away from RF antenna 412 that antenna adaptation element 416 will not impact (or significantly impact) the performance characteristics of RF antenna 412.

By applying a suitable amount of pressure to one or both of first portion 408 and second portion 410 of foldable electronic device 400, a user can cause flexible connector 406 to bend or fold along its long axis (which also causes foldable display 404 to bend or fold), thereby causing foldable electronic device 400 to assume the "folded mode" or "phone mode" configuration shown in FIG. 5.

FIG. 6 shows a side perspective view of foldable electronic device 400 when foldable electronic device 400 is operating in the "phone mode." As shown by this figure, when foldable electronic device 400 is operating in the "phone mode," antenna adaptation element 416 is closer to RF antenna 112 than when foldable electronic device 400 is operating in the "tablet/phablet" mode. Furthermore, when foldable electronic device 400 is operating in the "phone mode," antenna adaptation element 416 covers a portion of RF antenna 412 in a direction that is perpendicular to a plane of contact between first portion 408 and second portion 410 of foldable electronic device 400 (denoted by arrow 602 in FIG. 6). In this position, antenna adaptation element 416 impacts the performance characteristics of RF antenna 412 in a manner that mitigates or counteracts an undesired shifting of the RF antenna resonant frequency that would otherwise occur due to the folding of folding electronic device 400. In particular, in the "phone mode," antenna adaptation element 416 is positioned such that it ensures that the resonant frequency of RF antenna 412 remains within a target frequency band.

Figure 7:
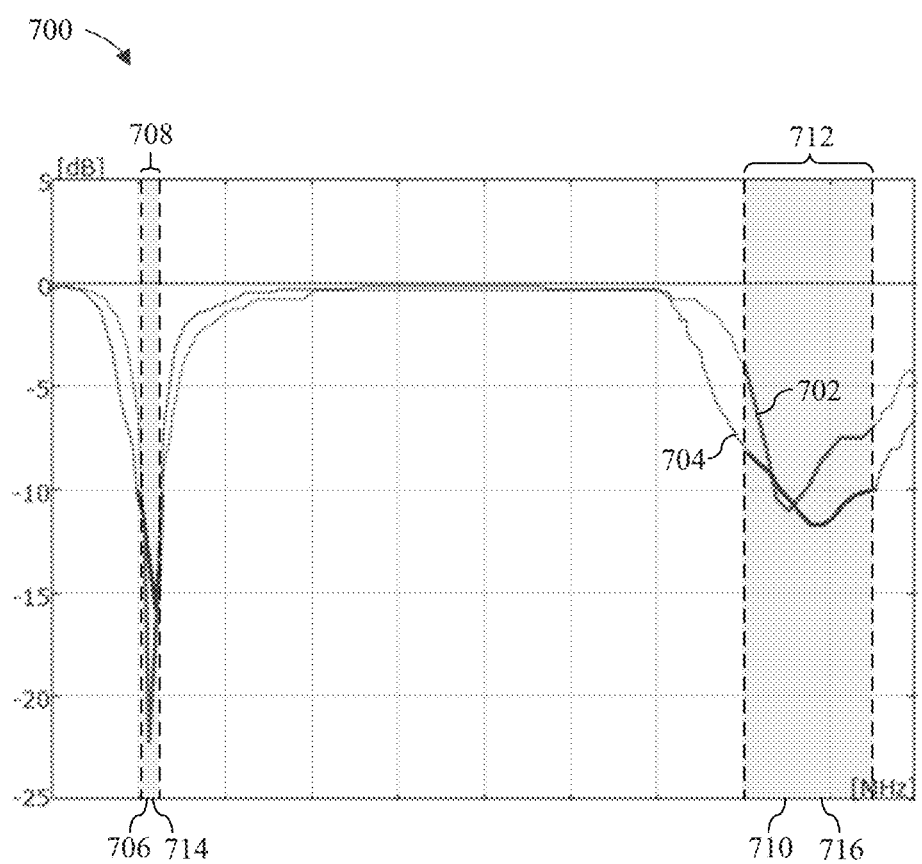
FIG. 7 is a graph that shows the reflection coefficient at various frequencies for an RF antenna of the foldable electronic device of FIGS. 4-6 when operating in the "tablet/phablet mode" and when operating in the "phone mode."

The effect of antenna adaptation element 416 on the performance characteristics of RF antenna 412 will now be further illustrated with respect to FIG. 7. In particular, FIG. 7 is a graph 700 that shows the reflection coefficient in dB at various frequencies for RF antenna 412 when foldable electronic device 400 is operating in the "tablet/phablet mode" and when foldable electronic device 400 is operating in the "phone mode." In particular, a plot 702 shows the reflection coefficient at various frequencies for RF antenna 412 when foldable electronic device 400 is operating in the "tablet/phablet mode" of FIG. 4 while a plot 704 shows the reflection coefficient at various frequencies for RF antenna 412 when foldable electronic device 400 is operating in the "phone mode" of FIGS. 5 and 6.

As shown by plot 702, when foldable electronic device 400 is operating in the "tablet/phablet mode," RF antenna 412 has a first resonant frequency 706 that is within a first frequency band 708 and a second resonant frequency 710 that is within a second frequency band 712. First frequency band 708 and second frequency band 712 are analogous to first frequency band 308 and second frequency band 312 of FIG. 3 and, as such, comprise target frequency bands for RF communication. By comparing plot 702 of FIG. 7 with plot 302 of FIG. 3, it can be seen that the resonant frequency characteristics of RF antenna 412 are substantially similar to those of RF antenna 112 of foldable electronic device 100 when operating in the "tablet/phablet" mode. This is due to the fact that the design of foldable electronic device 400 and RF antenna 412 is substantially similar to the design of foldable electronic device 100 and RF antenna 112, respectively. Although foldable electronic device 400 includes antenna adaptation element 416 while foldable electronic device 100 does not, in the "tablet/phablet" mode, antenna adaptation element 416 is sufficiently distanced from RF antenna 412 that it does not impact the resonant frequency characteristics of RF antenna 412. Since first resonant frequency 706 and second resonant frequency 710 of RF antenna 412 lie well within the target frequency bands, RF antenna 412 can be expected to provide acceptable RF communication performance when foldable electronic device 400 is operating in the "tablet/phablet" mode.

As shown by plot 704, when foldable electronic device 400 is operating in the "phone mode," the resonant frequencies of RF antenna 412 are not shifted downward and outside of the target frequency bands for RF communication as was the case for foldable electronic device 100 when operating in the same mode. This is due to the influence of antenna adaptation element 416 on RF antenna 412. When foldable electronic device 400 is operating in the "phone mode," antenna adaptation element 416 is sufficiently close to RF antenna 412 that it affects the performance characteristics thereof. In particular, in the "phone mode," antenna adaptation element 416 is positioned such that it mitigates or counteracts an undesired shifting of the RF antenna resonant frequency that would otherwise occur due to the folding of foldable electronic device 400. This can be seen from plot 704 which shows that, when foldable electronic device 400 is in the "phone mode," RF antenna 412 has a first resonant frequency 714 that is within first frequency band 708 and a second resonant frequency 716 that is within second frequency band 712. Since first resonant frequency 714 and second resonant frequency 716 of RF antenna 412 lie well within the target frequency bands, RF antenna 412 can be expected to provide acceptable RF communication performance when foldable electronic device 400 is operating in the "phone" mode as well as in the "tablet/phablet mode."

As can be seen from the foregoing, when foldable electronic device 400 is operating in the "phone mode," RF antenna 412 and antenna adaptation element 416 collectively form a self-adaptive antenna system that ensures that the resonant frequencies of RF antenna 412 remain within the target frequencies for RF communication. Such a system advantageously does not need to detect in which mode foldable electronic device 400 is currently operating in order to tune RF antenna 412 to the desired frequencies. Instead, this self-adaptive system adjusts the resonant frequencies automatically due to the material loading effect that occurs when antenna adaptation element 416 is brought into proximity with RF antenna 412 in the "phone mode."

In an embodiment, antenna adaptation element 416 comprises a passive, parasitic element that is integrated on or within first portion 408 of foldable electronic device 400. The material composition, form, size, shape, and position of antenna adaption element 416 may be selected to provide the desired modification of the performance characteristics of RF antenna 412 when foldable electronic device 400 is operating in the "phone mode." In particular, such characteristics of antenna adaptation element 416 may be selected to ensure that the resonant frequencies of RF antenna 412 will fall within corresponding target frequency bands for RF communication when foldable electronic device 400 is operating in the "phone mode."

Antenna adaptation element 416 may be comprised of any material or materials that provide a suitable modification of the performance characteristics of RF antenna 412 when foldable electronic device 400 is in the "phone mode." In one embodiment, antenna adaptation element 416 comprises a metal. In another embodiment, antenna adaptation element 416 comprises a ceramic. In further accordance with such an embodiment, antenna adaptation element 416 comprises a ceramic having a relatively high dielectric constant. In yet another embodiment, antenna adaptation element 416 comprises a dielectric material. Still other types of materials may be used to implement antenna adaptation element 416. Furthermore, various combinations of material types may be used, including combinations of the foregoing material types (metal, ceramic, and dielectric).

The mechanical form of antenna adaptation element 416 may vary depending upon the implementation. For example, in an embodiment in which antenna adaptation element 416 comprises a metal, antenna adaptation element 416 may comprise a trace, a wire, or a flat or stamped sheet of metal. As another example, in an embodiment in which antenna adaptation element 416 comprises a ceramic, antenna adaptation element 416 may comprise a block of ceramic. Still other mechanical forms may be used.

The position of antenna adaptation element 416 on or within foldable electronic device 400 may also be varied. For example, in one embodiment, antenna adaptation element 416 is positioned such that when foldable electronic device 400 is in the "phone mode," antenna adaptation element 416 will cover all or a portion of RF antenna 412 in a direction that is perpendicular to a plane of contact between first portion 408 and second portion 410 of foldable electronic device 400. In another embodiment, antenna adaptation element 416 is positioned such that when foldable electronic device 400 is in the "phone" mode, antenna adaptation element 416 will not cover any portion of RF antenna 412 in a direction that is perpendicular to the aforementioned plane of contact. In further accordance with this embodiment, while there may be no overlap between antenna adaptation element 416 and RF antenna 412 in the direction perpendicular to the aforementioned plane of contact, there may be an edge-to-edge alignment between at least some edges of these components when foldable electronic device 400 is in the "phone mode."

Figure 8:
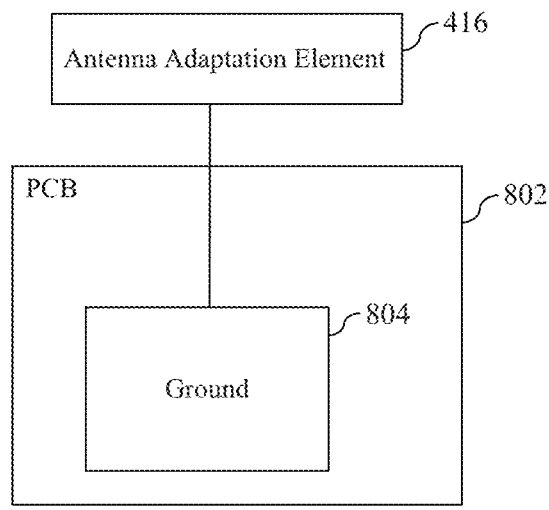
FIG. 8 is a block diagram of a foldable electronic device in accordance with an embodiment in which an antenna adaptation element is directly connected to a ground located on a printed circuit board (PCB) of the device.

In one embodiment, antenna adaptation element 416 is grounded. One example of such an embodiment is illustrated in FIG. 8. In particular, FIG. 8 is a block diagram of an embodiment in which antenna adaptation element 416 is grounded via a connection to a ground 804. Ground 804 is disposed on or within a PCB 802 that is located in an internal cavity of foldable electronic device 400. In further accordance with such an embodiment, ground 804 may comprise a ground plane disposed on or within PCB 802. The configuration shown in FIG. 8 is presented herein by way of example only and persons skilled in the relevant art(s) will appreciate that other configurations, connections or techniques may be used to ground antenna adaptation element 416.

Figure 9:
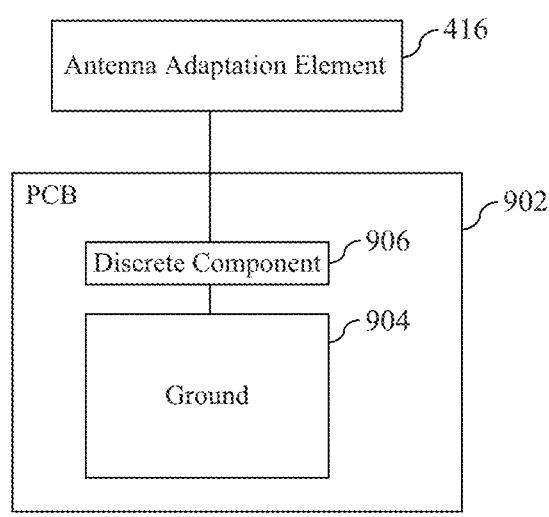
FIG. 9 is a block diagram of a foldable electronic device in accordance with an embodiment in which an antenna adaptation element is connected via a discrete component to a ground located on a PCB of the device.

In an alternate embodiment, antenna adaptation element 416 is connected to a ground via a discrete component. One example of such an embodiment is illustrated in FIG. 9. In particular, FIG. 9 is a block diagram of an embodiment in which antenna adaptation element 416 is connected to a ground 904 via discrete component 906. Ground 904 and discrete component 906 are each disposed on or within a PCB 902 that is located in an internal cavity of foldable electronic device 400. Discrete component 906 may be loaded on a pin that is connected to ground 904. Discrete component 906 may comprise, for example and without limitation, a capacitor, an inductor, or a switch. However, these examples are not intended to be limiting and other discrete components may be used. By varying the parameters of discrete component 906, the impact of antenna adaptation element 416 on the performance characteristics of RF antenna 412 can advantageously be fine-tuned during manufacturing of foldable electronic device 400.

In a further embodiment, antenna adaptation element 416 may not be connected to a ground at all. In such an embodiment, antenna adaptation element 416 may be thought of as an electrically "floating" element.

Figure 10:
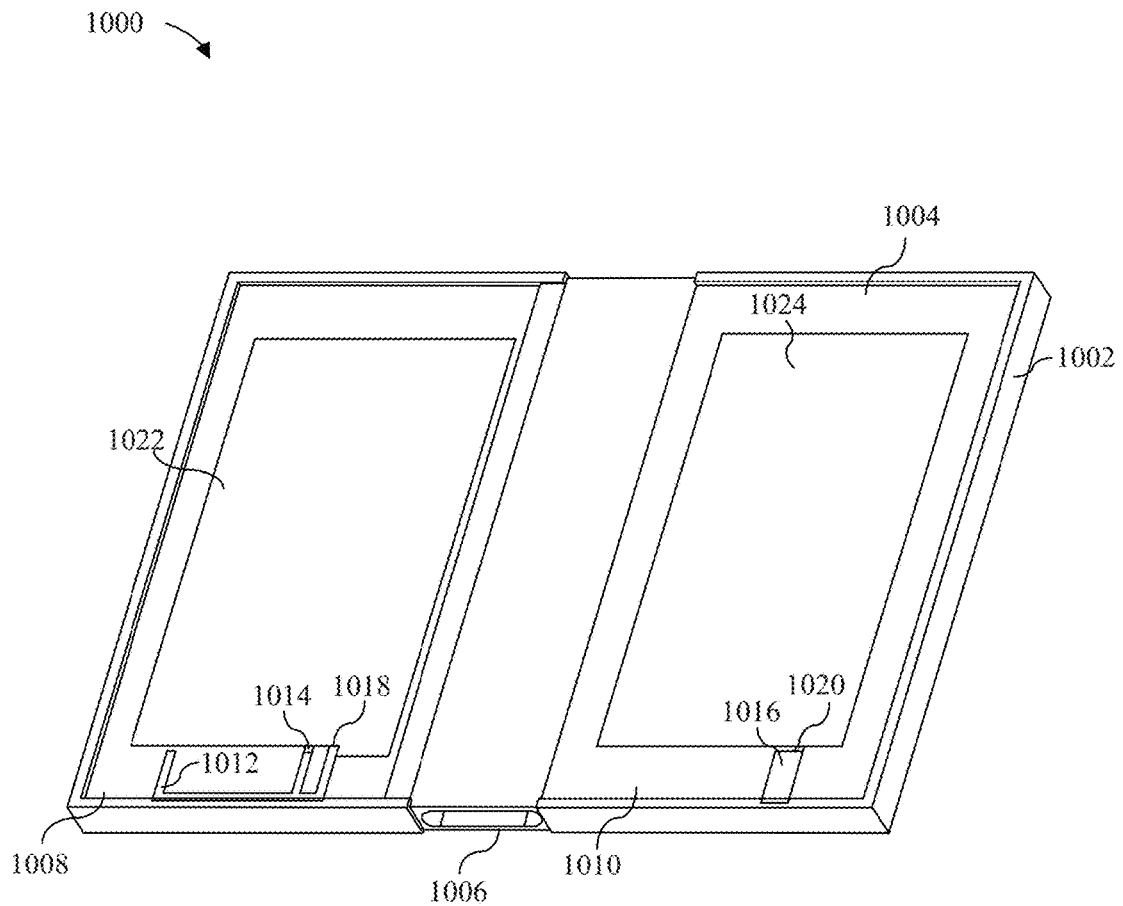
FIG. 10 is a perspective view of a foldable electronic device in a "tablet/phablet mode," the foldable electronic device including a self-adaptive RF antenna system in accordance with an embodiment.
Figure 11:
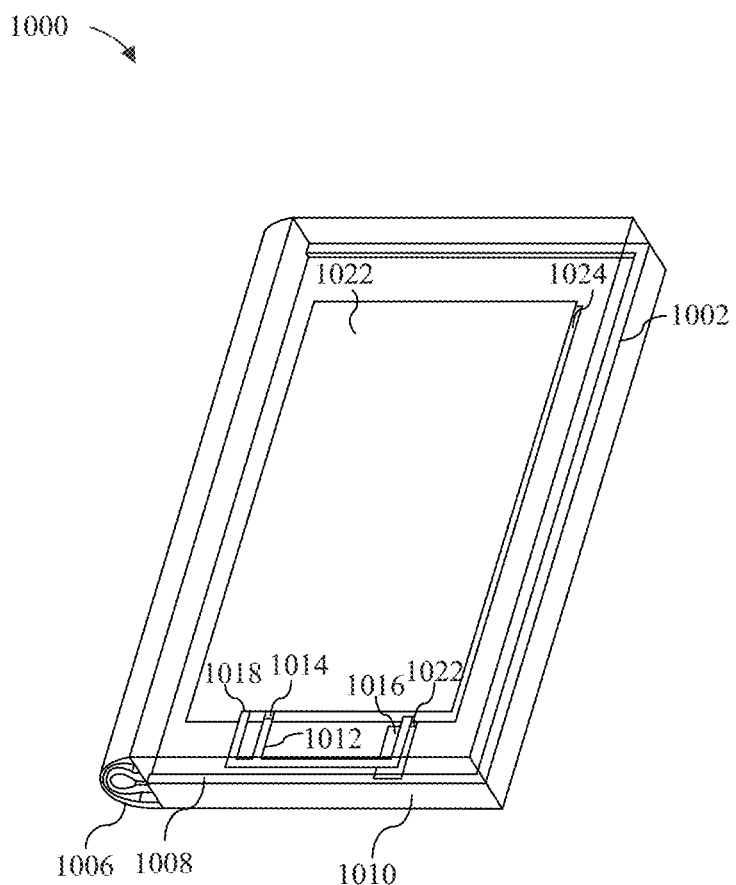
FIG. 11 is a perspective view of the foldable electronic device of FIG. 10 in a "phone mode."

By way of further illustration, a particular implementation of a foldable electronic device that includes a self-adaptive antenna system will now be described in reference to FIGS. 10-12. In particular, FIGS. 10 and 11 provide perspective views of a foldable electronic device 1000. Foldable electronic device 1000 comprises a housing 1002, a foldable display 1004, and a flexible connector 1006 that serves to connect a first portion 1008 of foldable electronic device 1000 to a second portion 1010 thereof.

An RF antenna 1012 is located in an internal cavity defined at least in part by housing 1002. RF antenna 1012 is connected via a feed 1014 to an RF transmitter and/or receiver (not shown). The RF transmitter and/or receiver is disposed on a PCB 1022 that is located within the same internal cavity as RF antenna 1012. RF antenna 1012 is also connected to a ground of PCB 1022 via a ground pin 1018. RF antenna 1012, feed 1014, ground pin 1018, and PCB 1022 are all situated within first portion 1008 of foldable electronic device 1000.

In this embodiment, RF antenna 1012 comprises a PIFA. The PIFA comprises a copper film that is printed directly on an internal portion of housing 1002 or on a carrier that is attached thereto. However, other fabrication methods may be used.

RF antenna 1012 is used to facilitate the transmission and/or reception of RF signals by foldable electronic device 1000 in a well-known manner, thereby enabling foldable electronic device 1000 to engage in RF communication. For example, such RF communication may be carried out in accordance with any of the RF-based communication technologies previously described herein.

As further shown in FIGS. 10 and 11, foldable electronic device 1000 also includes an antenna adaptation element 1016. In this embodiment, antenna adaptation element 1016 is disposed within an internal cavity defined at least in part by housing 1002. Antenna adaptation element 1016 is connected via a discrete component 1020 to a ground of a PCB 1024 that is located within the same internal cavity. Antenna adaptation element 1016, discrete component 1020 and PCB 1024 are all situated within second portion 1010 of foldable electronic device 1000.

In this embodiment, antenna adaptation element 1016 comprises a rectangular-shaped layer of copper. Antenna adaptation element 1016 may be printed directly on an internal portion of housing 1002 or on a carrier that is attached thereto. However, other fabrication methods may be used. Discrete component 1020 may comprise, for example, a capacitor, an inductor, or a switch.

In FIGS. 10 and 11, for the sake of illustration only, housing 1002 and foldable display 1004 have been rendered transparent so that RF antenna 1012, feed 1014, ground pin 1018, PCB 1022, antenna adaptation element 1016, discrete component 1020 and PCB 1024 are all visible. However, it is to be understood that, in this embodiment, such components are disposed within one or more internal cavities of foldable electronic device 1000 and thus would not normally be visible to an end user thereof.

FIG. 10 shows foldable electronic device 1000 in an "open mode" or "tablet/phablet" mode. In this mode, antenna adaptation element 1016 is far enough away from RF antenna 1012 that adaptation element 1016 will not impact (or significantly impact) the performance characteristics of RF antenna 1012.

FIG. 11 shows foldable electronic device 1000 in a "folded mode" or "phone mode." When foldable electronic device 1000 is operating in the "phone mode," antenna adaptation element 1016 is closer to RF antenna 1012 than when foldable electronic device 1000 is operating in the "tablet/phablet" mode. Furthermore, when foldable electronic device 1000 is operating in the "phone mode," antenna adaptation element 1016 covers a portion of RF antenna 1012 in a direction that is perpendicular to a plane of contact between first portion 1008 and second portion 1010 of foldable electronic device 1000. In this position, antenna adaptation element 1016 impacts the performance characteristics of RF antenna 1012 in a manner that mitigates or counteracts an undesired shifting of the RF antenna resonant frequency that would otherwise occur due to the folding of folding electronic device 1000.

Figure 12:
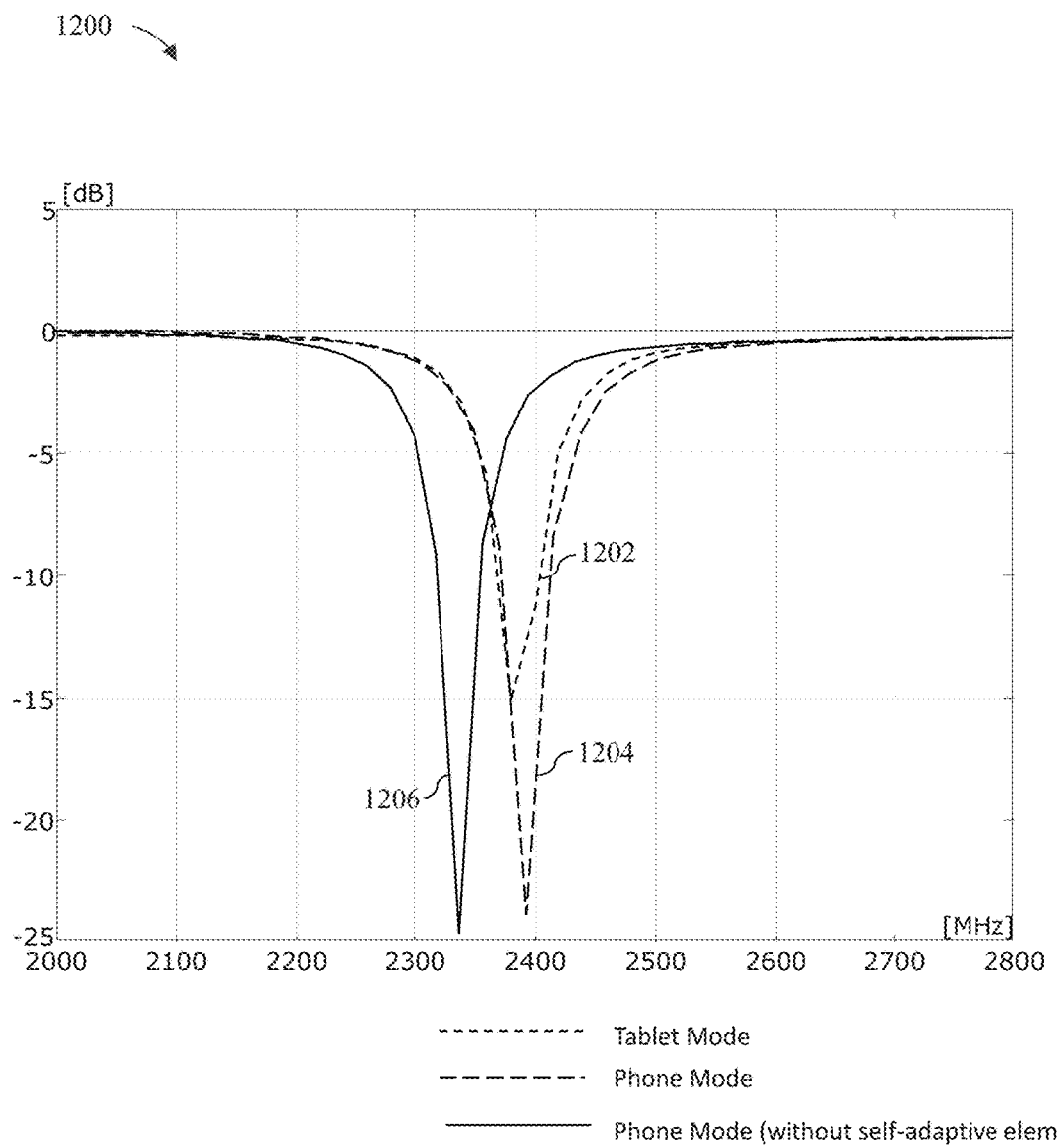
FIG. 12 is a graph that shows the reflection coefficient at various frequencies for an RF antenna of the foldable electronic device of FIGS. 10 and 11 when operating in the "tablet/phablet mode" and when operating in the "phone mode."

The effect of antenna adaptation element 1016 on the performance characteristics of RF antenna 1012 will now be further illustrated with respect to FIG. 12. In particular, FIG. 12 is a graph 1200 that includes a plot 1202 that shows the reflection coefficient at various frequencies for RF antenna 1012 when foldable electronic device 1000 is operating in the "tablet/phablet mode" of FIG. 10, a plot 1204 that shows the reflection coefficient at various frequencies for RF antenna 1012 when foldable electronic device 1000 is operating in the "phone mode" of FIG. 11, and a plot 1206 that shows the reflection coefficient at various frequencies for RF antenna 1012 when foldable electronic device 1000 is operating in the "phone mode" of FIG. 11 in an alternate embodiment that does not include antenna adaptation element 1016.

As shown by plot 1202, when foldable electronic device 1200 is operating in the "tablet/phablet mode," RF antenna 1012 has a resonant frequency of approximately 2380 MHz. It is to be assumed for the sake of this example, that this resonant frequency comprises a desired or target resonant frequency for the purpose of RF communication. Since RF antenna 1012 has a resonant frequency that is a desired or target resonant frequency for RF communication, RF antenna 1012 can be expected to provide acceptable RF communication performance when foldable electronic device 1000 is operating in the "tablet/phablet" mode As shown by plot 1206, in an alternate embodiment in which foldable electronic device 100 does not include antenna adaptation element 1016, when foldable electronic device 1200 is operating in the "phone mode," the resonant frequency of RF antenna 1012 is shifted downward to approximately 2335 MHz. This is a significant shift that can negatively impact the RF communication performance of foldable electronic device 1000. As was previously discussed, this shift in resonant frequencies is attributable to the change of form factor of foldable electronic device 1000 that occurs when foldable electronic device 1000 is converted from the "tablet/phablet mode" to the "phone mode."

As shown by plot 1204, when foldable electronic device 1000 includes antenna adaptation element 1016 and is operating in the "phone mode," antenna adaptation element 1016 is sufficiently close to RF antenna 1012 that it affects the performance characteristics thereof. In particular, in the "phone mode," antenna adaptation element 1016 is positioned such that it mitigates or counteracts the undesired shifting of the RF antenna resonant frequency that would otherwise occur due to the folding of foldable electronic device 1000 (as illustrated by plot 1206). As a result, RF antenna 1012 has a resonant frequency of approximately 2395 MHz, as shown by plot 1204. This resonant frequency may enable foldable electronic device to maintain satisfactory RF communication performance while operating in the "phone mode."

The self-adaptive antenna systems and methods described herein are not limited to two-layer foldable electronic devices such as were described above in reference to FIGS. 4-12. Rather, the systems and methods described herein can be extended to foldable electronic devices having three, four, or even more layers.

Figure 13:
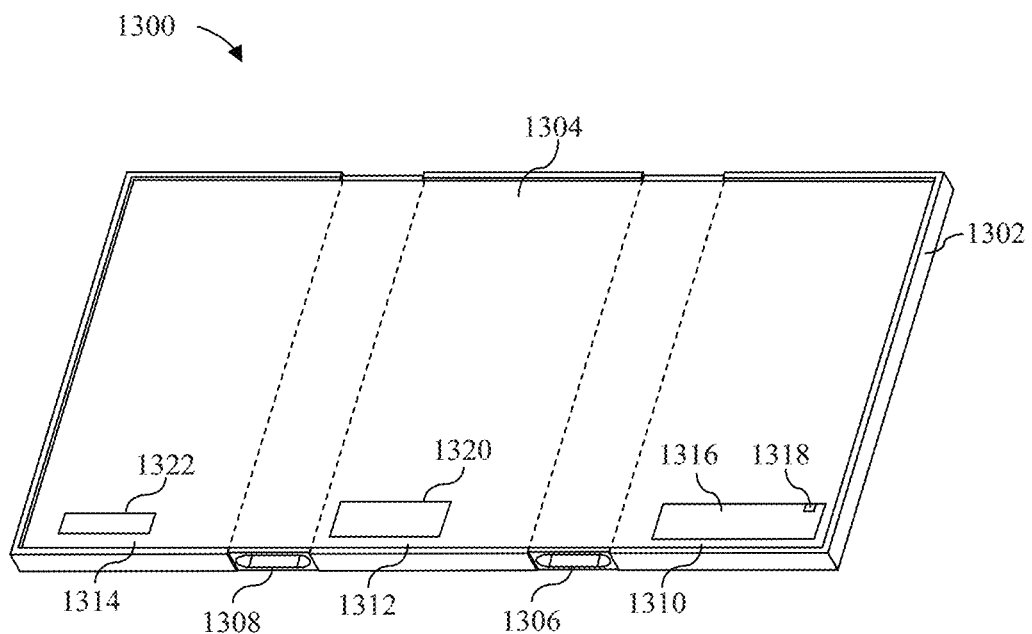
FIG. 13 is a perspective view of a three-layer foldable electronic device in a "tablet mode," the three-layer foldable electronic device including a self-adaptive RF antenna system in accordance with an embodiment.
Figure 14:
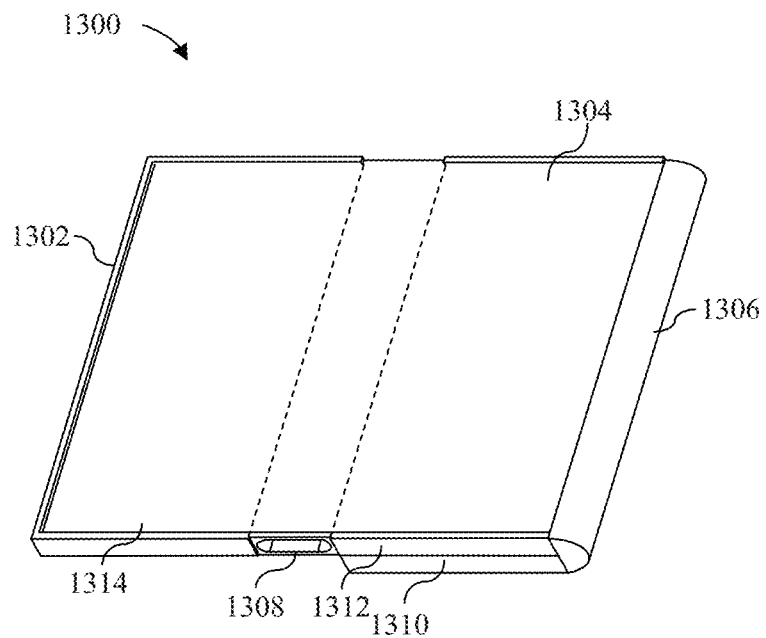
FIG. 14 is a perspective view of the three-layer foldable electronic device of FIG. 13 in a "phablet" mode.
Figure 15:
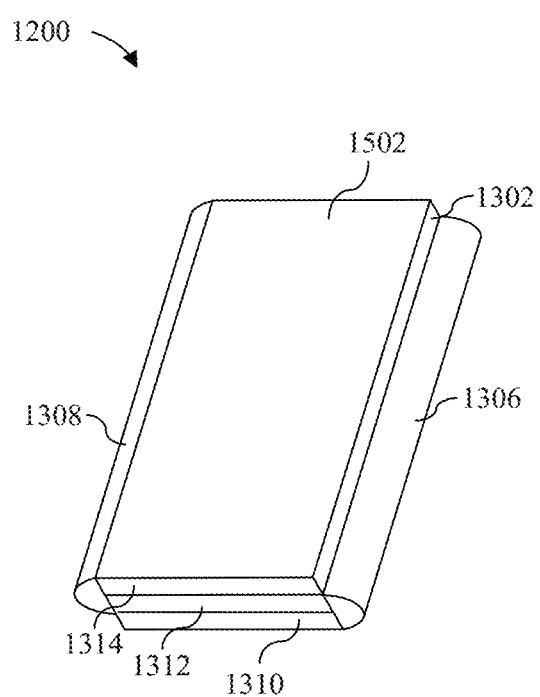
FIG. 15 is a perspective view of the three-layer foldable electronic device of FIGS. 13 and 14 in a "phone" mode.

By way of example, FIGS. 13-15 depict a three-layer foldable electronic device 1300 that includes a self-adaptive antenna system in accordance with an embodiment. As shown in FIG. 13, foldable electronic device 1300 comprises a housing 1302, a foldable display 1304, a first flexible connector 1306 that serves to connect a first portion 1310 of foldable electronic device 1300 to a second portion 1312 thereof, and a second flexible connector 1308 that serves to connect second portion 1312 of foldable electronic device 1300 to a third portion 1314 thereof. An RF antenna 1316 is located in an internal cavity defined at least in part by housing 1302 and is connected via a feed 1318 to an RF transmitter and/or receiver (not shown) that is also included within the same cavity. RF antenna 1312 and feed 1314 are further situated within first portion 1310 of foldable electronic device 1300.

As further shown in FIG. 13, foldable electronic device 1300 also includes a first antenna adaptation element 1320 and a second antenna adaptation element 1322. First antenna adaptation element 1320 is disposed within an internal cavity defined at least in part by housing 1302 and is also situated within second portion 1312 of foldable electronic device 1300. Second antenna adaptation element 1322 is disposed within an internal cavity defined at least in part by housing 1302 and is also situated within third portion 1314 of foldable electronic device 1300. RF antenna 1316, feed 1318, first antenna adaptation element 1320 and second antenna adaptation element 1322 are shown in FIG. 13 for the sake of illustration only; it is to be understood that, in this embodiment, such components are disposed within one or more internal cavities of foldable electronic device 1300 and thus would not normally be visible to an end user thereof.

RF antenna 1316 is used to facilitate the transmission and/or reception of RF signals by foldable electronic device 1300 in a well-known manner, thereby enabling foldable electronic device 1300 to engage in RF communication. Such RF communication may be carried out in accordance with any of the RF-based communication technologies previously described herein. Furthermore, RF antenna 1316 may comprise any one of a variety of different RF antenna types (e.g., microstrip antenna, PIFA, monopole antennas, loop antenna, etc.).

FIG. 13 shows foldable electronic device 1300 in a "tablet" mode. In this mode, a user of foldable electronic device 1300 can view content that is rendered to the entire area of foldable display 1304 and potentially interact therewith. Furthermore, in this mode, first antenna adaptation element 1320 and second antenna adaptation element 1322 are each far enough away from RF antenna 1316 that they will not impact (or significantly impact) the performance characteristics of RF antenna 1316.

By applying a suitable amount of pressure to one or more portions of foldable electronic device 1300, a user can cause flexible connector 1306 to bend or fold along its long axis (which also causes foldable display 1304 to bend or fold), thereby causing foldable electronic device 1300 to assume the "phablet mode" configuration shown in FIG. 14. In the "phablet mode" configuration, first portion 1310 of foldable electronic device 1300 is folded behind second portion 1312, thereby decreasing the area of foldable display 1304 that a user can view and optionally interact with.

In the "phablet mode," first antenna adaptation element 1320 is closer to RF antenna 1316 than when foldable electronic device 1300 is operating in the "tablet mode." Furthermore, in this mode, first antenna adaptation element 1320 may cover a portion of RF antenna 1316 in a direction that is perpendicular to a plane of contact between first portion 1310 and second portion 1312 of foldable electronic device 1300. In this position, first antenna adaptation element 1320 impacts the performance characteristics of RF antenna 1316 in a manner that mitigates or counteracts an undesired shifting of the RF antenna resonant frequency that would otherwise occur due to the transition of folding electronic device 1300 from "tablet mode" to "phablet mode." For example, in the "phablet mode," first antenna adaptation element 1320 may be positioned such that it ensures that the resonant frequency of RF antenna 1316 remains within a target frequency band.

In the "phablet mode," second antenna adaptation element 1320 is still far enough away from RF antenna 1316 that it will not impact (or significantly impact) the performance characteristics of RF antenna 1316 as influenced by first antenna adaptation element 1320.

Once foldable electronic device is in the "phablet mode" shown in FIG. 14, by applying a suitable amount of pressure to one or more portions of foldable electronic device 1300, a user can cause flexible connector 1308 to bend or fold along its long axis (which also causes foldable display 1304 to bend or fold), thereby causing foldable electronic device 1400 to assume the "phone mode" configuration shown in FIG. 15. In the "phone mode," third portion 1314 of foldable electronic device 1300 is folded over second portion 1312, thereby concealing foldable display 1304 from view. In this mode, the user may instead interact with some form of user interface that is accessible via a back surface 1502 of third portion 1314 of foldable electronic device 1300. This additional user interface, may comprise, for example, another display that is smaller than foldable display 104, one or more LEDs, one or more buttons, or the like.

In the "phone mode," second antenna adaptation element 1322 is closer to first antenna adaptation element 1320 and RF antenna 1316 than when foldable electronic device 1300 is operating in the "phablet mode" or the "tablet mode." Furthermore, in this mode, second antenna adaptation element 1322 may cover a portion of first antenna adaptation element 1320 and/or RF antenna 1316 in a direction that is perpendicular to a plane of contact between second portion 1312 and third portion 1314 of foldable electronic device 1300. In this configuration, second antenna adaption element 1322 impacts the performance characteristics of RF antenna 1316 and first antenna adaptation element 1320 in a manner that mitigates or counteracts an undesired shifting of the RF antenna resonant frequency that would otherwise occur due to the transition of foldable electronic device 1300 from "phablet mode" to "phone mode." For example, in the "phone mode," second antenna adaptation element 1322 may be positioned such that it ensures that the resonant frequency remains within a target frequency band.

Each of first antenna adaptation element 1320 and second antenna adaptation element 1322 may comprises a passive, parasitic element that is integrated on or within a respective portion of foldable electronic device 1300. The material composition, form, size, shape, and position of each antenna adaption element may be selected to provide the desired modification of the performance characteristics of RF antenna 1316 when foldable electronic device 1300 is operating in the "phablet mode" and in the "phone mode." In particular, the characteristics of first antenna adaptation element 1320 and second antenna adaptation element 1322 may be selected to ensure that the resonant frequencies of RF antenna 1316 will fall within corresponding target frequency bands for RF communication when foldable electronic device 1300 is operating in the "phablet mode" and in the "phone mode."

In the embodiments described above, no more than one antenna adaptation element is included in a given layer of a foldable electronic device. However, in alternate embodiments, a layer of a foldable electronic device may include two or more antenna adaptation elements. For example, a plurality of antenna adaptation elements in a single layer of a foldable electronic device may be used to collectively influence the performance characteristics an RF antenna included within the foldable electronic device. As another example, in a foldable electronic device that includes a plurality of RF antennas, each of a plurality of antenna adaptation elements included in a layer of a foldable electronic device may be used to influence the performance characteristics of a corresponding one of the plurality of RF antenna within the foldable electronic device.

In the embodiments described above, each of the RF antenna and the antenna adaptation element(s) are located in an internal cavity of the foldable electronic device. However, in alternate embodiments, one or more of these components may be external to the foldable electronic device, in whole or in part. For example, an antenna adaptation element may be connected to an external portion of the device housing. As another example, an RF antenna may be external to the device and connected thereto via a suitable antenna connector.

In the embodiments described above, one or two frequency bands are targeted for RF communication. For example, in the embodiments described above in reference to FIGS. 4-7, two frequency bands are targeted for RF communication. As another example, in the embodiments described above in reference to FIGS. 10-12, a single frequency band is targeted for RF communication. However, it is to be understood that the techniques described herein for implementing a self-adaptive antenna system may be used in embodiments that target any number of frequency bands for RF communication (including 3 or more frequency bands). It is to be further understood that such self-adaptive antenna systems may operate to ensure that one or more resonant frequencies associated with an RF antenna fall within one or more corresponding target frequency bands for RF communication irrespective of the current operating mode and form factor of the device that includes the RF antenna.

In accordance with a further embodiment, an antenna adaptation element may be integrated into the device housing itself. For example, the antenna adaptation element may form part of the housing of the foldable electronic device. The antenna adaptation element may also serve some other functional purpose within the foldable electronic device. For example, the antenna adaptation element may also serve as a mechanical support structure within the foldable electronic device.

It should be further noted that the self-adaptive antenna systems described herein are not limited only to foldable electronic devices. Rather, the self-adaptive antenna systems described herein may be implemented in any device that includes an RF antenna and can be placed or configured in different operating modes having different form factors, wherein the difference in form factors will impact the performance characteristics of the RF antenna. Some non-limiting examples of such devices will now be provided.

Figure 16:
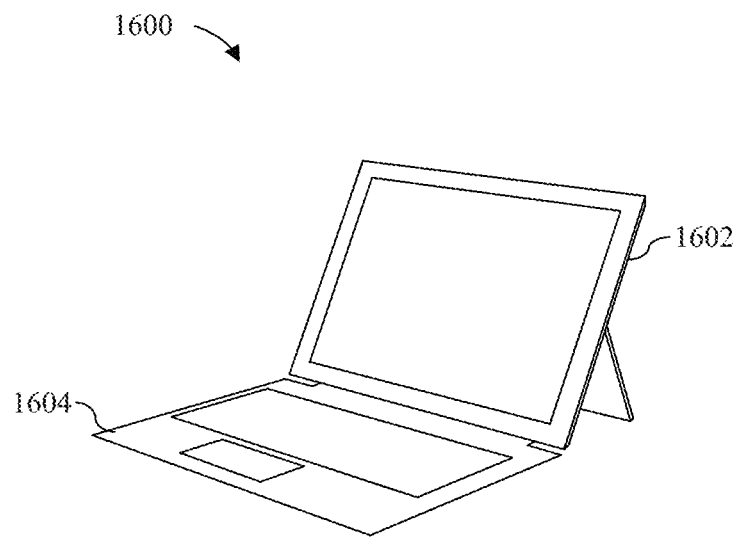
FIG. 16 is a perspective view of a tablet computer in a first operating mode, the tablet computer including a self-adaptive RF system in accordance with an embodiment.
Figure 17:
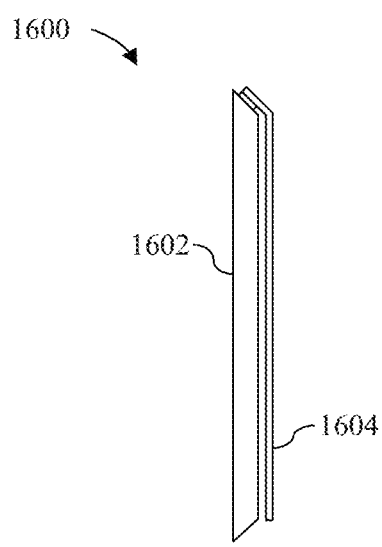
FIG. 17 is a side perspective view of the tablet computer of FIG. 16 in a second operating mode.

As first example, a self-adaptive antenna system may be implemented in a tablet computer that includes an RF antenna and that has a keyboard (e.g., a fixed or detachable keyboard) that can be folded behind the tablet when the user would rather use a touch screen than the keyboard to interact with the tablet. An example of such a tablet computer is shown in FIG. 16. In particular, FIG. 16 is a perspective view of a tablet computer 1600 in a first operating mode. As shown in FIG. 16, tablet computer 1600 includes a tablet 1602 and a keyboard 1604. In the first operating mode, keyboard 1604 is folded away from and in front of tablet 1602 so that it can be accessed by a user thereof to provide input to tablet 1602. However, in a second operating mode that is shown in FIG. 17, keyboard 1604 is folded behind tablet 1602 so that a user can instead provide input to tablet 1602 via a touch screen thereof. For the purposes of this example, it is assumed that tablet 1602 includes an RF antenna, the performance characteristics of which are impacted by the transition from the first operating mode of FIG. 16 to the second operating mode of FIG. 17. In particular, a resonant frequency of the RF antenna may be shifted away from a desired frequency or frequency band by virtue of the transition from the first operating mode of FIG. 16 to the second operating mode of FIG. 17. In accordance with the techniques described herein, an antenna adaptation element may be integrated into keyboard 1604 to mitigate or counteract this undesired frequency shift.

Figure 18:
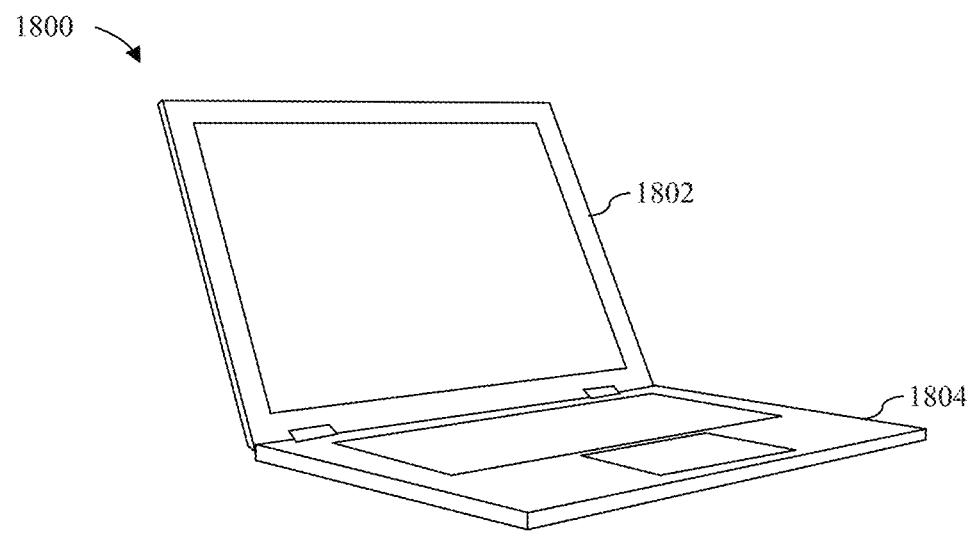
FIG. 18 is a perspective view of a laptop computer in a first operating mode, the laptop computer including a self-adaptive RF system in accordance with an embodiment.

As another example, a self-adaptive antenna system may be implemented in a laptop computer that includes an RF antenna and that has a display portion and a keyboard portion that can be folded behind the display portion when the user would rather use a touch screen than the keyboard portion to interact with the display portion. An example of such a laptop computer is shown in FIG. 18. In particular, FIG. 18 is a perspective view of a laptop computer 1800 in a first operating mode. As shown in FIG. 18, tablet computer 1800 includes a display portion 1802 and a keyboard portion 1804. In the first operating mode, keyboard portion 1804 is folded away from and in front of display portion 1802 so that it can be accessed by a user thereof to provide input to laptop 1800. However, in a second operating mode that is shown in FIG. 19, keyboard portion 1804 is folded behind display portion 1802 so that a user can instead provide input to display portion 1802 via a touch screen thereof.

Figure 19:
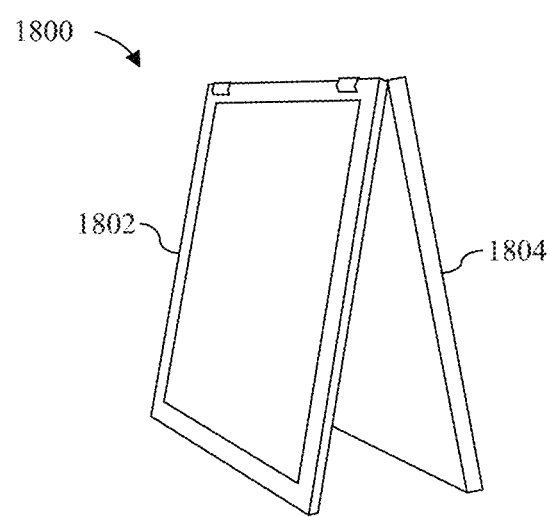
FIG. 19 is a perspective view of the laptop computer of FIG. 18 in a second operating mode.

In one embodiment, display portion 1802 includes an RF antenna, the performance characteristics of which are impacted by the transition from the first operating mode of FIG. 18 to the second operating mode of FIG. 19. In particular, a resonant frequency of the RF antenna may be shifted away from a desired frequency or frequency band by virtue of the transition from the first operating mode of FIG. 18 to the second operating mode of FIG. 19. In accordance with the techniques described herein, an antenna adaptation element may be integrated into keyboard portion 1804 to mitigate or counteract this undesired frequency shift.

In an alternate embodiment, keyboard portion 1804 includes an RF antenna, the performance characteristics of which are impacted by the transition from the first operating mode of FIG. 18 to the second operating mode of FIG. 19. In particular, a resonant frequency of the RF antenna may be shifted away from a desired frequency or frequency band by virtue of the transition from the first operating mode of FIG. 18 to the second operating mode of FIG. 19. In accordance with the techniques described herein, an antenna adaptation element may be integrated into display portion 1802 to mitigate or counteract this undesired frequency shift.

As yet another example, a self-adaptive antenna system may be implemented in a system that includes an electronic device (e.g., a laptop computer, a tablet computer, a smartphone or other electronic device) that includes an RF antenna and a structure within which the electronic device can be inserted. For example, the structure may comprise a docking station. The electronic device may be inserted into the docking station for the purpose of electrically connecting the electronic device to additional components (e.g., a charger, a monitor, speakers, etc.) and/or for support purposes. In further accordance with this example, an antenna adaptation element may be included in the docking station. When the electronic device is inserted into the docking station, the antenna adaptation element will impact the performance characteristics of the RF antenna in a manner that mitigates or counteracts an undesired shifting of the RF antenna resonant frequency that would otherwise occur due to the insertion of the electronic device into the docking station.

As still another example, a self-adaptive antenna system may be implemented in a tablet computer, smartphone, or other electronic device that includes an RF antenna and that can be inserted into a structure such as a carrying case, a sheath or a holster. In further accordance with this example, an antenna adaptation element may be included in the carrying case, the sheath or the holster. When the electronic device is inserted into the carrying case, sheath or holster, the antenna adaptation element will impact the performance characteristics of the RF antenna in a manner that mitigates or counteracts an undesired shifting of the RF antenna resonant frequency that would otherwise occur due to the insertion of the electronic device into the carrying case, sheath or holster.

III. Further Example Embodiments

An electronic device is described herein that is configurable to be transitioned from a first operating mode having a first form factor to a second operating mode having a second form factor. The electronic device comprises a first device portion that includes an RF antenna and a second device portion that is connected to the first device portion and includes a first antenna adaptation element. The first antenna adaptation element is positioned more closely to the RF antenna in the second operating mode than in the first operating mode. The first antenna adaptation element is configured to, in the second operating mode, passively counteract a shifting of a resonant frequency of the RF antenna that would otherwise occur as a result of the electronic device being transitioned from the first operating mode to the second operating mode.

In one embodiment of the foregoing electronic device, the first antenna adaptation element is configured to, in the second operating mode, cause the resonant frequency of the RF antenna to remain within a target frequency band for RF communication.

In another embodiment of the foregoing electronic device, the RF antenna comprises one of a microstrip antenna, a planar inverted-F antenna, a monopole antenna, and a loop antenna.

In yet another embodiment of the foregoing electronic device, the first antenna adaptation element comprises one or more of a metal, a ceramic, and a dielectric material.

In still another embodiment of the foregoing electronic device, the first antenna adaptation element is positioned such that, in the second operating mode, the first antenna adaptation element covers at least part of the RF antenna in a direction that is particular to a plane of contact between the first device portion and the second device portion.

In a further embodiment of the foregoing electronic device, the first antenna adaptation element is connected to a ground. In further accordance with such an embodiment, the first antenna adaptation element is connected to the ground via a discrete component. In accordance with still further embodiments, the discrete component comprises a capacitor, an inductor, or a switch. In another embodiment, the first antenna adaptation element is not connected to any ground.

In a still further embodiment of the foregoing electronic device, the electronic device is further configurable to be transitioned from the second operating mode to a third operating mode. In this embodiment, the electronic device further comprises a third device portion that is connected to the second device portion and includes a second antenna adaptation element. The second antenna adaptation element is positioned more closely to the RF antenna in the third operating mode than in the first operating mode and the second operating mode. The second antenna adaptation element is configured to, in the third operating mode, passively counteract a shifting of the resonant frequency of the RF antenna that would otherwise occur as a result of the electronic device being transitioned from the second operating mode to the third operating mode.

In another embodiment of the foregoing electronic device, at least one of the RF antenna and the first antenna adaptation element is disposed within an internal cavity of the electronic device.

In yet another embodiment of the foregoing electronic device, at least a portion of at least one of the RF antenna and the first antenna adaptation element is external to the electronic device.

In still another embodiment of the foregoing electronic device, the electronic device comprises a foldable display that spans the first device portion and the second device portion. In accordance with such an embodiment, transitioning the electronic device from the first operating mode to the second operating mode comprises folding the foldable display.

In a further embodiment of the foregoing electronic device, the first device portion comprises a tablet computer and the second device portion comprises a keyboard.

In a still further embodiment of the foregoing electronic device, the first device portion comprises a display portion of a laptop computer and the second device portion comprises a keyboard portion of the laptop computer.

A foldable electronic device is also described herein. The foldable electronic device comprises a first portion that includes an RF antenna, a second portion that includes a first antenna adaptation element, a first flexible connector that connects the first portion to the second portion, and a foldable display that spans at least the first portion, the first flexible connector, and the second portion. The first flexible connector and the foldable display enable the foldable electronic device to be selectively configured in either a first operating mode in which the first portion and the second portion are not folded toward each other or a second operating mode in which the first portion and the second portion are folded toward each other. The first antenna adaptation element is closer to the RF antenna in the second operating mode than in the first operating mode. The first antenna adaptation element is a passive element that is configured to, in the second operating mode, mitigate a shifting of a resonant frequency of the RF antenna that would otherwise occur as a result of the foldable electronic device being transitioned from the first operating mode to the second operating mode.

In one embodiment of the foregoing foldable electronic device, wherein the first operating mode comprises a tablet mode or phablet mode and wherein the second operating mode comprises a phone mode.

In another embodiment of the foregoing foldable electronic device, the foldable electronic device further includes a third portion that includes a second antenna adaptation element and a second flexible connector that connects the second portion to the third portion. The foldable display further spans the second flexible connector and the third portion. The second flexible connector and the foldable display further enable the foldable electronic device to be selectively configured in a third operating mode in which the second portion and the third portion are folded toward each other. The second portion and the third portion are not folded toward each other in the second operating mode. The second antenna adaptation element is closer to the RF antenna in the third operating mode than in the first operating mode and the second operating mode. The second antenna adaptation element is a passive element that is configured to, in the third operating mode, mitigate a shifting of the resonant frequency of the RF antenna that would otherwise occur as a result of the foldable electronic device being transitioned from the second operating mode to the third operating mode.

In further accordance with this embodiment, the first operating mode comprises a tablet mode, the second operating mode comprises a phablet mode, and the third operating mode comprises a phone mode.

A system is also described herein. The system comprises an electronic device comprising an RF antenna and a structure configured to permit insertion of the electronic device therein. The structure includes an antenna adaptation element. The antenna adaptation element is positioned more closely to the RF antenna when the electronic device is inserted in the structure than when the antenna adaptation element is not inserted in the structure. The antenna adaptation element is configured to, when the electronic device is inserted in the structure, passively counteract a shifting of a resonant frequency of the RF antenna that would otherwise occur as a result of the electronic device being inserted into the structure.

In accordance with various embodiments of the foregoing system, the structure comprises a docking station, a carrying case, a sheath, or a holster.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An electronic device that is configurable to be transitioned from a first operating mode having a first form factor to a second operating mode having a second form factor, the electronic device comprising:
   a first device portion that includes a radio frequency (RF) antenna; and
   a second device portion that is connected to the first device portion and includes a first antenna adaptation element;
   the first antenna adaptation element being positioned more closely to the RF antenna in the second operating mode than in the first operating mode and the first antenna adaptation element being configured to, in the second operating mode, passively counteract a shifting of first and second resonant frequencies of the RF antenna that would otherwise occur as a result of the electronic device being transitioned from the first operating mode to the second operating mode so that the first resonant frequency of the RF antenna remains within a first target frequency band for RF communication and the second resonant frequency of the RF antenna remains within a second target frequency band for RF communication.

2. The electronic device of claim 1, wherein the RF antenna comprises one of a microstrip antenna, a planar inverted-F antenna, a monopole antenna, and a loop antenna.

3. The electronic device of claim 1, wherein the first antenna adaptation element comprises one or more of a metal, a ceramic, and a dielectric material.

4. The electronic device of claim 1, wherein the first antenna adaptation element is positioned such that, in the second operating mode, the first antenna adaptation element covers at least part of the RF antenna in a direction that is particular to a plane of contact between the first device portion and the second device portion.

5. The electronic device of claim 1, wherein the first antenna adaptation element is connected to a ground.

6. The electronic device of claim 5, wherein the first antenna adaptation element is connected to the ground via a discrete component.

7. The electronic device of claim 6, wherein the discrete component comprises a capacitor, an inductor, or a switch.

8. The electronic device of claim 1, wherein at least one of the RF antenna and the first antenna adaptation element is disposed within an internal cavity of the electronic device.

9. The electronic device of claim 1, wherein at least a portion of at least one of the RF antenna and the first antenna adaptation element is external to the electronic device.

10. The electronic device of claim 1, wherein the electronic device comprises a foldable display that spans the first device portion and the second device portion and wherein transitioning the electronic device from the first operating mode to the second operating mode comprises folding the foldable display.

11. The electronic device of claim 1, wherein the first device portion comprises a tablet computer and the second device portion comprises a keyboard.

12. The electronic device of claim 1, wherein the first device portion comprises a display portion of a laptop computer and the second device portion comprises a keyboard portion of the laptop computer.

13. The electronic device of claim 1, wherein the first target frequency band includes lower frequencies than the second target frequency band.

14. A foldable electronic device, comprising:
   a first portion that includes a radio frequency (RF) antenna;
   a second portion that includes a first antenna adaptation element;
   a first flexible connector that connects the first portion to the second portion; and
   a foldable display that spans at least the first portion, the first flexible connector, and the second portion;
   the first flexible connector and the foldable display enabling the foldable electronic device to be selectively configured in either a first operating mode in which the first portion and the second portion are not folded toward each other or a second operating mode in which the first portion and the second portion are folded toward each other, the first antenna adaptation element being closer to the RF antenna in the second operating mode than in the first operating mode;
   the first antenna adaptation element being a passive element that is configured to, in the second operating mode, mitigate a shifting of first and second resonant frequencies of the RF antenna that would otherwise occur as a result of the foldable electronic device being transitioned from the first operating mode to the second operating mode so that the first resonant frequency of the RF antenna remains within a first target frequency band for RF communication and the second resonant frequency of the RF antenna remains within a second target frequency band for RF communication.

15. The foldable electronic device of claim 14, wherein the first operating mode comprises a tablet mode or phablet mode and wherein the second operating mode comprises a phone mode.

16. The foldable electronic device of claim 14, wherein the first target frequency band includes lower frequencies than the second target frequency band.

17. A foldable electronic device, comprising:
a first portion that includes a radio frequency (RF) antenna;
a second portion that includes a first antenna adaption element;
a third portion that includes a second antenna adaptation element;
a first flexible connector that connects the first portion to the second portion;
a second flexible connector that connects the second portion to the third portion; and
a foldable display that spans at least the first portion, the first flexible connector, the second portion, the second flexible connector and the third portion;
the first flexible connector and the foldable display enabling the foldable electronic device to be selectively configured in either a first operating mode in which the first portion and the second portion are not folded toward each other or a second operating mode in which the first portion and the second portion are folded toward each other, the first antenna adaptation element being closer to the RF antenna in the second operating mode than in the first operating mode;
the second flexible connector and the foldable display further enabling the foldable electronic device to be selectively configured in a third operating mode in which the second portion and the third portion are folded toward each other, the second portion and the third portion not being folded toward each other in the second operating mode, the second antenna adaptation element being closer to the RF antenna in the third operating mode than in the first operating mode and the second operating mode;
the first antenna adaptation element being a passive element that is configured to, in the second operating mode, mitigate a shifting of a resonant frequency of the RF antenna that would otherwise occur as a result of the foldable electronic device being transitioned from the first operating mode to the second operating mode;
the second antenna adaptation element being a passive element that is configured to, in the third operating mode, mitigate a shifting of the resonant frequency of the RF antenna that would otherwise occur as a result of the foldable electronic device being transitioned from the second operating mode to the third operating mode.

18. The foldable electronic device of claim 16, wherein the first operating mode comprises a tablet mode, wherein the second operating mode comprises a phablet mode, and wherein the third operating mode comprises a phone mode.

19. The foldable electronic device of claim 16, wherein the first operating mode comprises a tablet mode or phablet mode and wherein the second operating mode comprises a phone mode.

20. An electronic device that is configurable to be transitioned from a first operating mode having a first form factor to a second operating mode having a second form factor and from the second operating mode to a third operating mode, the electronic device comprising:
a first device portion that includes a radio frequency (RF) antenna;
a second device portion that is connected to the first device portion and includes a first antenna adaptation element; and
a third device portion that is connected to the second device portion and includes a second antenna adaption element;
the first antenna adaptation element being positioned more closely to the RF antenna in the second operating mode than in the first operating mode and the first antenna adaptation element being configured to, in the second operating mode, passively counteract a shifting of a resonant frequency of the RF antenna that would otherwise occur as a result of the electronic device being transitioned from the first operating mode to the second operating mode; and
the second antenna adaptation element being positioned more closely to the RF antenna in the third operating mode than in the first operating mode and the second operating mode and the second antenna adaptation element being configured to, in the third operating mode, passively counteract a shifting of the resonant frequency of the RF antenna that would otherwise occur as a result of the electronic device being transitioned from the second operating mode to the third operating mode.

* * * * *